Aug. 23, 1932.    G. H. JOHANSON    1,872,961
GAS AND AIR VALVE
Filed Jan. 19, 1929
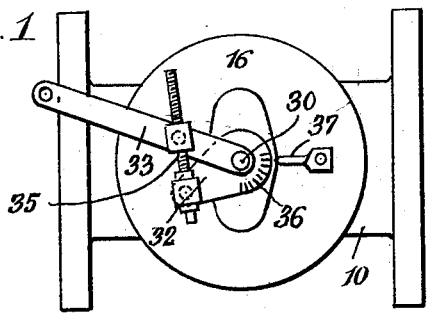
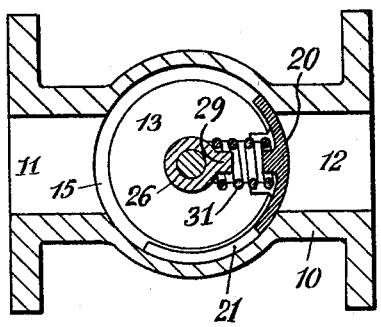
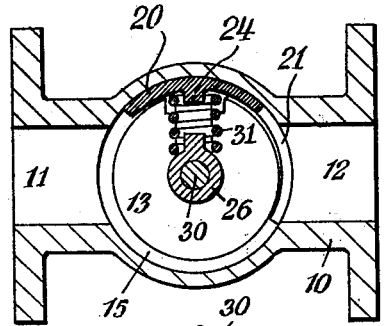
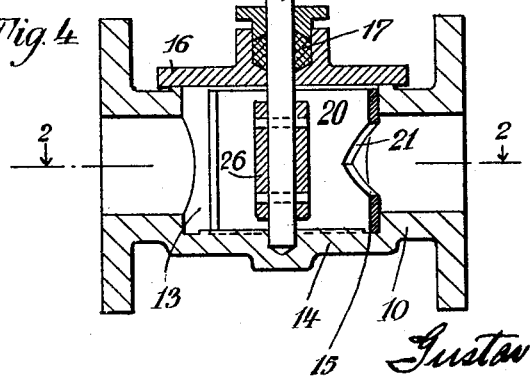
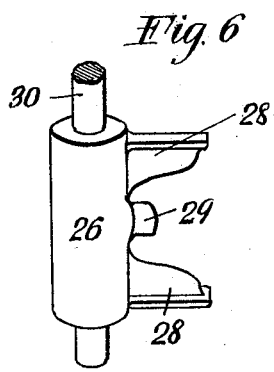
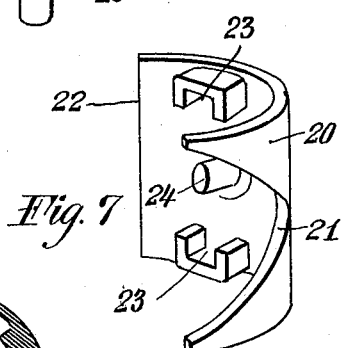
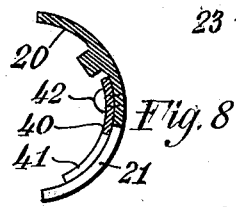
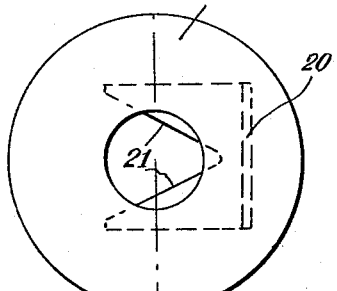
INVENTOR
Gustav H. Johanson
BY
ATTORNEY Patented Aug. 23, 1932

1,872,961

UNITED STATES PATENT OFFICE

GUSTAV H. JOHANSON, OF PHILADELPHIA, PENNSYLVANIA, ASSIGNOR TO CHRISTIAN WILHJELM, OF PHILADELPHIA, PENNSYLVANIA, AS TRUSTEE

GAS AND AIR VALVE

Application filed January 19, 1929. Serial No. 333,720.

The object of this invention is to provide an improved valve for controlling the air on oil fired furnaces, or for controlling the air and gas on gas fired furnaces, or for other purposes where proportional opening of the valve is required for intermediate positions between minimum and maximum valve settings, in particular where the fuel and air valves are operated as a unit.

In such cases it has been found to be of especial advantage to provide a valve having a V-shaped opening for controlling the fuel supply pipes.

Accordingly the invention is embodied in a valve arranged and constructed as hereinafter set forth and as illustrated in the accompanying drawing in which Fig. 1 is a plan view of the valve.

Fig. 2 is a horizontal sectional view showing the valve closed and taken on lines 2—2 of Figure 4.

Fig. 3 is a horizontal sectional view showing the valve open.

Fig. 4 is a vertical sectional view of the valve on line 4—4 of Figure 5.

Fig. 5 is an end view.

Fig. 6 is a perspective view of the valve operating member.

Fig. 7 is a perspective view of the valve itself.

Fig. 8 shows a modification.

Referring to the drawing, the valve consists of a valve casing 10 having an inlet 11 and an outlet 12. The casing forms a circular valve chamber 13 having a bottom 14 provided with a circular track 15. The top of the chamber is closed with a suitable cover 16 provided with a stuffing box 17. The cover is secured by bolts in the usual manner, not shown.

The valve itself, see Figure 7, is in the form of a semi cylindrical or semi circular shell 20 provided in its one edge with a substantially V-shaped opening or cut out 21. The V-shaped opening occupies substantially one-half of the surface area of the valve, hence a quarter turn of the valve is sufficient to move it from full open to full closed position. The other edge 22 of the valve is preferably straight. The valve is further provided with two recesses 23, 23 and a pin 24. The latter and the recesses 23 are preferably disposed centrally of the main body of the valve as distinguished from the opening 21.

The valve is operated by an operating member, Figure 6, comprising a hub 26 and two arms 28, 28 and a pin 29. The hub is pinned to the valve stem 30 which rests in the bottom of the valve chamber and extends upwardly through the stuffing box 17. A spring 31 is interposed between the operating member and the valve and rests conveniently on the two pins 27 and 24.

To the stem 30 there is secured an actuating member comprising the two arms 32 and 33, Figure 1, which may be adjusted and locked together by means as at 35. A scale 36 and pointer 37 may be provided for purposes of adjustment and measurement in operation.

The valve 20 fits inside the valve chamber 13 and rests in and moves on the track 15. The valve is operated by the operating member, which arms 28 fit into the recesses 23. The valve is at all times pressed against the wall of the chamber by the spring 31.

Figure 2 shows the valve in full closed position where it is seen that the valve completely spans and closes the outlet 12. Figure 3 shows the valve in full open position, see also Figure 5. By operating the valve from open to closed position, the V-shaped valve opening sweeps across the outlet to vary the opening area for the passage of the fuel in proportion to the fuel demand of the furnace for a given temperature or condition.

Preferably the opening on the valve is so proportioned that full valve opening gives approximately seventy-five per cent of line capacity. This may be accomplished by shaping the opening 21 accordingly, or as shown in Figure 8, a shutter 40 having an opening 41 may be used for regulating the valve opening, the shutter being readily filed or shaped to suit and adjustably mounted by screws 42. The valve is readily detachable from the stem so that valves with differently proportioned or differently shaped openings may be substituted if desired. The arrangement of inlet and outlet is preferred as shown because the fluid controlled assists in tight closure by pressing against the inside of the valve.

I claim:—

A valve comprising a valve casing forming a valve chamber having a vertical cylindrical wall and a flat bottom, a diametrically opposed inlet and outlet leading to said valve chamber, a circular track in the bottom of the latter, a valve in the form of a substantially semi-circular shell having a V-shaped opening or cut out in its one edge extending inwardly from said edge substantially half way across the surface of said valve shell and adapted to move in said track against the vertical wall of the valve chamber, a shutter member mounted on the inside of said valve for adjusting the V-opening thereof, a valve operating member in said chamber having arms engaging recesses provided in the valve, a spring for pressing the valve against the chamber wall and means for actuating said operating member.

GUSTAV H. JOHANSON.